United States Patent
Pfaller et al.

(10) Patent No.: US 11,203,246 B2
(45) Date of Patent: Dec. 21, 2021

(54) HEAT EXCHANGER FOR A VEHICLE, AND AN AIR-CONDITIONING UNIT, AND ASSOCIATED METHOD

(71) Applicant: AUDI AG, Ingolstadt (DE)

(72) Inventors: Willibald Pfaller, Pollenfeld (DE); Sascha Rös, Neuburg (DE)

(73) Assignee: AUDI AG, Ingolstadt (DE)

( * ) Notice: Subject to any disclaimer, the term of this patent is extended or adjusted under 35 U.S.C. 154(b) by 144 days.

(21) Appl. No.: 16/479,334

(22) PCT Filed: Dec. 20, 2017

(86) PCT No.: PCT/EP2017/083722
§ 371 (c)(1),
(2) Date: Jul. 19, 2019

(87) PCT Pub. No.: WO2018/134017
PCT Pub. Date: Jul. 26, 2018

(65) Prior Publication Data
US 2019/0337353 A1    Nov. 7, 2019

(30) Foreign Application Priority Data
Jan. 20, 2017    (DE) ............ 10 2017 200 947.0

(51) Int. Cl.
*B60H 1/00* (2006.01)
(52) U.S. Cl.
CPC ..... *B60H 1/00071* (2013.01); *B60H 1/00335* (2013.01); *B60H 2001/00135* (2013.01)
(58) Field of Classification Search
CPC ........... B60H 1/00042; B60H 1/00064; B60H 1/00071; B60H 1/00335; B60H 2001/00142; B60H 2001/00092; B60H 2001/00135; B60H 1/00478
See application file for complete search history.

(56) References Cited

U.S. PATENT DOCUMENTS

| 2005/0263277 A1* | 12/2005 | Kim ............... B60H 1/00071 165/203 |
| 2019/0168567 A1* | 6/2019 | Schmitt ............. B60H 1/00678 |

FOREIGN PATENT DOCUMENTS

| DE | 19811967 A1 | 9/1999 |
| DE | 10142512 A1 | 4/2003 |
| DE | 10225469 C1 | 7/2003 |
| DE | 102007014835 A1 | 9/2008 |

(Continued)

OTHER PUBLICATIONS

Machine translation of DE102013009515 (Year: 2014).*

(Continued)

*Primary Examiner* — Joseph F Trpisovsky
(74) *Attorney, Agent, or Firm* — Maier & Maier, PLLC

(57) ABSTRACT

A heat exchanger, preferably for a vehicle, including an applicative stratification, wherein the applicative stratification includes at least two stratification strands, wherein the applicative stratification is configured in such a manner that when incoming air into the heat exchanger is supplied in the direction of the applicative stratification, the incoming air is spread out by means of the applicative stratification in the respective stratification strand into an associated outgoing air portion. Furthermore, an exemplary embodiment may include an air-conditioning unit and an associated method.

12 Claims, 1 Drawing Sheet

(56) References Cited

FOREIGN PATENT DOCUMENTS

| DE | 102013009515 A1 | 12/2014 |
| EP | 2011675 A2 | 1/2009 |
| FR | 2742384 A1 | 6/1997 |
| JP | 2007-131137 A | 5/2007 |
| KR | 10-2010-0086546 A | 8/2010 |

OTHER PUBLICATIONS

German Examination Report dated Jul. 17, 2017 in corresponding German Application No. 10 2017 200 947.0; 16 pages.
International Search Report and Written Opinion dated Mar. 19, 2018 in corresponding International Application No. PCT/EP2017/083722; 24 pages.
English-language translation of International Preliminary Report on Patentability dated Aug. 1, 2019 in corresponding International Application No. PCT/EP2017/083722; 8 pages.

* cited by examiner

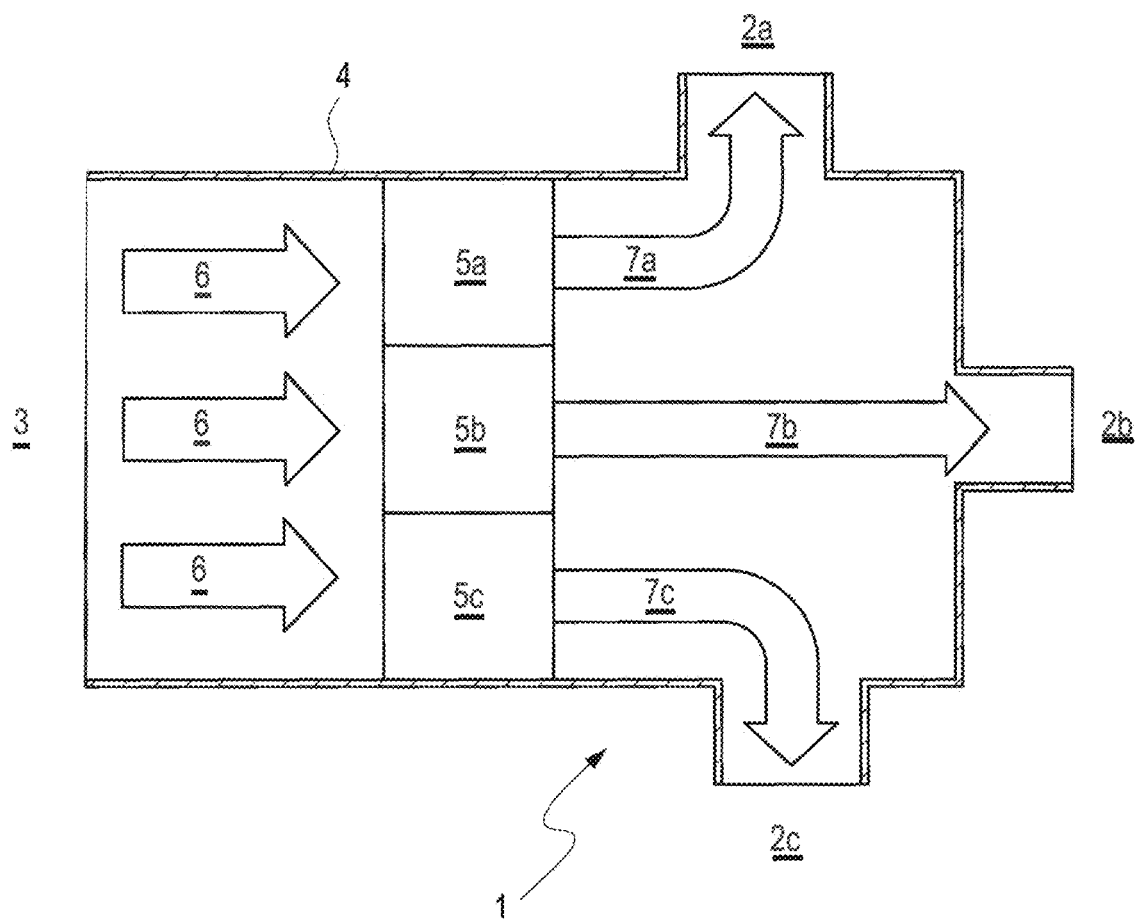

HEAT EXCHANGER FOR A VEHICLE, AND AN AIR-CONDITIONING UNIT, AND ASSOCIATED METHOD

FIELD

The disclosure relates to a heat exchanger, preferably for a vehicle, and an air-conditioning unit. Furthermore, the invention relates to a method for spreading out incoming air in the heat exchanger or the air-conditioning unit.

BACKGROUND

It is known in general that air-conditioning units are used for cooling and/or heating the vehicle interior of a motor vehicle. It is known in this case that the air-conditioning units are individually designed for the respective vehicle or the respective vehicle series Furthermore, using a heat exchanger, which heats the air flowing through it, for the heating in an air-conditioning unit is known. The heat exchanger is arranged, for example, in the air-conditioning unit or is embodied as a separate component. As a separate component, the heat exchanger can form an air-conditioning unit in partial functions.

The air-conditioning units have so-called guide elements, to be able to deflect airflows in an air-conditioning unit. Guide elements can be formed, for example, as movable flaps. The guide elements are designed suitably for the respective air-conditioning unit and are arranged at predefined points therein. The guide elements firstly set a desired temperature of the airflow in the air-conditioning unit by the arrangement thereof, by suitably mixing these air quantities/portions and/or intentionally guiding them into one another. For example, it is possible to mix a heated airflow which was heated by means of a heat exchanger with cold ambient air from the outside in the air-conditioning unit by positioning the guide elements suitably for the vehicle interior. Multiple guide elements are then necessary for various temperatures of airflows, which then each mix together the air quantities individually for the outflows by the arrangement thereof. The mixed portions are then each supplied to the vehicle interior. In this case, the heat exchanger always heats the supplied air at a defined temperature.

These guide elements thus enable the respective exiting airflow from the air-conditioning unit to be able to be set suitably via the respective outflows (outlets) of the air-conditioning unit. It is thus possible that a larger quantity of heated airflow exits at one outflow than at another outflow by means of the guide elements, by these guide elements dividing, mixing, and/or deflecting the airflow. Air at different temperatures is also introduced into the vehicle interior due to the exit of differently heated quantities of air into the vehicle interior at the respective outflow. The vehicle interior (i.e., the passenger compartment) is thus suitably heatable.

DE 10 2007 014 835 A1 discloses a vehicle air-conditioning system having means for cooling and heating air, which comprises a housing having at least three air outlets. In this case, the means for heating the air is provided as at least one heating heat exchanger, which has at least one cold air passage in its vertical extension, wherein a cold air passage is arranged between two heating paths.

DE 198 11 967 A1 discloses a method for regulating a heating system or air-conditioning system of a motor vehicle, in which air is blown in separately and at different temperatures in zones arranged horizontally one over another, such as foot well, torso region, and head region to obtain a temperature stratification and in which at least one left/right separation of the temperature regulation is provided for the separate temperature control of at least driver side and passenger side. In this case, the temperature stratification is automatically set and readjusted in dependence on a signal of an incident sunshine sensor.

DE 101 42 512 A1 discloses an electrical heating device, preferably for motor vehicles, having a frame through which air flows, which holds multiple heating slats located adjacent to one another in the transverse direction of the frame and extending in the longitudinal direction of the frame, wherein heating resistors are arranged between the heating slats so that one heating resistor is connected in a thermally conductive manner to two adjacent heating elements. In this case, the frame forms a temperature gradient extending in the longitudinal direction by the heating slats being formed so that the frame has at least two regions having differing heat transfer.

It is disadvantageous that in the event of changes, for example, in the passenger compartment of the vehicle or a vehicle series, new air-conditioning units have to be developed and thus the arrangement of the guide elements also has to be redeveloped in each case to ensure a good temperature distribution at the outlets of the respective vehicle. Alternatively or additionally to the change in the passenger compartment of a vehicle or a vehicle series, climate control philosophies can also prompt a redevelopment.

SUMMARY

The object of the invention is therefore to provide a settable temperature distribution at the outflows of an air-conditioning unit independently of a specific product series, for example, a vehicle series or a specific climate control philosophy.

The object is achieved in that a heat exchanger, preferably for a vehicle, comprises an applicative stratification, wherein the applicative stratification comprises at least two stratification strands, wherein the applicative stratification is configured in such a manner that when incoming air into the heat exchanger is supplied in the direction of the applicative stratification, the incoming air is spread out by means of the applicative stratification in the respective stratification strand into an associated outgoing air portion.

Outgoing air having specific properties thus results upon the exit from the applicative stratification. According to the invention, for example, an associated incoming air portion (which then becomes an outgoing air portion) is heated or cooled to a specific temperature in the respective stratification strand, so that upon exit of the respective outgoing air portions from the applicative stratification, a temperature stratification results by means of the outgoing air portions. A heating or cooling circuit thus forms in the respective stratification strand.

The term spreading is to be understood in this case in the sense of the invention to mean that flowing air is divided into portions (air quantity division) and/or is deflected. Mixing of the outgoing air portions does not take place in the respective stratification strand due to the spreading. After the respective stratification strand, in one embodiment, no further mixing of the spread-out outgoing air portions is to take place. In an alternative embodiment, further at least partial mixing of the outgoing air portions is possible after the respective stratification strand. At least one deflection in relation to the original flow direction is possible by means of the deflection. In the case of solely division, no deflection takes place, i.e., the spread portion is guided further in the same direction (deviation by 0°).

A heat exchanger can be designed according to the invention as an electric heater. The heat exchanger preferably has at least one PTC resistance element in a stratification strand. It is possible that a stratification strand has, for example, 2 or 3 PTC resistance elements. The PTC resistance element represents a means for heating in this case. Alternatively, it is possible that the heat exchanger is designed as a cooler, by means of which the respective outgoing air portion can be cooled. This cooler is designed, for example, as a vaporizer or Peltier element.

The heat exchanger according to the invention can be used in any form of a transportation means, in addition to a vehicle, for example, also in an aircraft, a ship, a gondola, or the like. Alternatively, the heat exchanger according to the invention can also be used in a caravan, trailer, or the like. Alternatively, the heat exchanger can also be used in a mobile device.

It is advantageous that by means of the invention, the heating or cooling power in the heat exchanger can be varied in regions by the spreading, without mechanical means such as guide elements, for example, being necessary or at least being provided reduced in the number thereof in relation to the prior art because of the invention. The temperature stratification thus takes place in one embodiment solely due to the stratification strands. Subsequent mixing after the respective outgoing air portions of the stratification strands is possible, however, for example, by at least one guide element, for example, in the form of a guide flap.

The applicative stratification enables in this case a division of an airflow into at least two portions, wherein a specific quantity/a specific portion of air flows through each stratification strand. It is accordingly possible by means of the applicative stratification that a specific heating or cooling power is set in this case in the respective stratification strand, so that the air flowing through it reaches a specific temperature. The spread-out airflow is then guided out of the respective outflow of the heat exchanger or air-conditioning unit.

It is furthermore advantageous that due to the spreading out, independently of the vehicle or the vehicle series or climate control philosophy, a heat exchanger or air-conditioning unit can be used, since in each case the air quantity and additionally the air temperature can be set suitably for the respective outflow by means of the applicative stratification. It is thus furthermore possible to set an individual temperature at the respective outlets of the air-conditioning unit up to the outflows into the vehicle interior. In one embodiment, no mixing of the air quantities is necessary after the applicative stratification or within it. Alternatively, for example, mixing of the outgoing air portions can still take place outside the heat exchanger using at least one guide element. A design adaptation of the heat exchanger is also not necessary, since the stratification strands can be set individually, for example, for each vehicle or each vehicle series or climate control philosophy. The setting also comprises the term activation.

The individually set stratification strands thus generate a specific flow of air having specific temperature properties. A temperature stratification thus results inside the heat exchanger or air-conditioning unit which can be set to the respective situation in the vehicle interior or outside the vehicle. This temperature stratification is then transferred via the outlets and outflows with respect to each individual layer into the vehicle interior.

It is furthermore advantageous according to the invention that in addition to the air distribution, which can be set, for example, via the outflows, the energy distribution can also be set, since each stratification strand can be set individually. Furthermore, the range of electric vehicles or hybrid vehicles is advantageously extended by the individual setting of the temperature in the stratification strand, since temperature-controlled air no longer has to be subsequently mixed in one embodiment of the invention, which results in a reduction of the effectivity.

According to the invention, the extent of development of an air-conditioning unit may advantageously be reduced, since the adaptation of the (temperature) base stratifications in the vehicle can be implemented using the heat exchanger, i.e., its applicative stratification.

In one advantageous embodiment, the stratification strand has means for heating or cooling the outgoing air portion. In this case, according to the invention, the heat exchanger is preferably only embodied as a cooler, i.e., its stratification strands can only cool, or only as a heater, i.e., its stratification strands can only heat.

In a further advantageous embodiment of the heat exchanger, it is possible that the heat exchanger has means for reducing the outgoing air portion out of the respective stratification strand. The volume flow can thus be regulated.

In a further advantageous embodiment of the heat exchanger, it is possible that the heat exchanger has means for reducing the ambient humidity in the respective stratification strand.

In a further advantageous embodiment of the heat exchanger, the stratification strands are arranged stacked on one another in the heat exchanger. It is thus possible, for example, that two stratification strands which have the same dimensions generate two outgoing air portions, which correspond with respect to the flow rate. In the case of different dimensions, the flow rate is accordingly different. The stratification strands are preferably arranged directly one on another in this case. Alternatively, it is possible that further components or a free space is provided between the stratification strands.

In a further advantageous embodiment, multiple stratification strands are arranged in series in succession and/or parallel to one another in the heat exchanger. It is thus possible to generate various outgoing air portions, which each have individual temperature portions. It is thus possible, for example, that two stratification strands are connected to one another in series and a single stratification strand is connected parallel thereto. These three stratification strands then form an applicative stratification. In this case, the stratification strands connected in series are preferably spaced apart at a spacing and the stratification strands connected in parallel are connected directly abutting one another (i.e., adjoining one another). A component or a free space can be provided in the spacing. In a further advantageous embodiment, the stratification strands can also alternatively or additionally be arranged adjacent to one another. This is possible in the case of the series arrangement and/or in the case of the parallel arrangement. Adjacent to one another comprises directly adjacent to one another or adjacent to one another with spacing.

In a further advantageous embodiment, the properties of the respective stratification strand are different. Property is to be understood in this case as the volume, the net area, and the power.

The above-described object is furthermore achieved by an air-conditioning unit, preferably for a vehicle, comprising a heat exchanger according to any one of claims 1 to 4, comprising at least one inlet opening for the supply of incoming air and at least two outlets for the discharge of the outgoing air portions, which have been conducted through the heat exchanger.

It is possible according to the invention that incoming air supplied to the air-conditioning unit is spread out in the heat exchanger into at least two portions of outgoing air. This is carried out by means of the applicative stratification. Because of the possibility that the outgoing air portions have been individually heated in the respective stratification strand to a specific temperature, outgoing air exits from the respective stratification strand at a specific temperature level. A temperature stratification of the individual outgoing air portions thus results after the applicative stratification of the heat exchanger in the air-conditioning unit. The individual outgoing air portions set at a specific temperature can then be supplied according to the invention to an outlet, preferably the assigned outlet.

In one advantageous embodiment, the air-conditioning unit comprises a control unit, wherein the respective stratification strand can be set by means of the control unit.

According to the invention, the temperature in a vehicle interior can be measured, for example, at at least one point, for example, two points. Alternatively or additionally, the temperature is measured outside the vehicle interior at at least one point.

By way of example, the vehicle interior furthermore has three settable outflows, which are fed by three outlets of the air-conditioning unit. To set an individual incident flow adapted to the temperature in the vehicle interior in the vehicle interior, a temperature stratification is generated by means of the stratification strands in the heat exchanger. The respective layer is then fed to the respective, precisely one single outlet. A feed thus takes place on the component side in the form of hardware. However, mechanical means for mixing portions of, for example, ambient air and heated air of an air-conditioning unit for the outflow out of the air-conditioning unit are not necessary to set specific temperatures. The stratification strands have suitably temperature-controlled the outgoing air portions according to the invention. These mechanical means for mixing portions of ambient air and heated air can additionally comprise the air-conditioning unit, however, so that mixing is also alternatively possible after the heat exchanger. An outlet can lead into a foot well of a vehicle, for example. The outlets are arranged arbitrarily in the air-conditioning unit in this case, so that a discharge out of the outlets can take place in any spatial direction, for example, to the right, to the left, upward, downward, laterally, or the like.

In one advantageous embodiment, the control unit has software, by means of which the respective stratification strand can be set to a specific temperature level after a measured temperature value from the vehicle interior has been supplied to the software, for example. A temperature level is to be understood in this case as an energy level, i.e., that the outgoing air portion is set to a specific temperature when the stratification strand is set to a specific energy level. According to the invention, the control unit can control or alternatively also regulate in this case, for example, if measured values are not provided or a setting is not performed.

It is thus possible by means of the invention that the setting in the respective stratification strand is adapted and thus changed during the operation, for example, of a vehicle. It is possible to react individually to the influences in the vehicle interior (and/or the vehicle surroundings). This can be carried out by the occupants, who activate the control unit by selecting a specific temperature in the vehicle interior, so that this control unit suitably sets the stratification strands of the heat exchanger. Alternatively or additionally, the control unit can automatically suitably set the stratification strands of the heat exchanger by receiving the at least one value from the vehicle interior, so that an optimum exit temperature out of the respective outlet takes place due to the set temperature stratification. The vehicle occupants in the passenger compartment thus receive an adapted airflow in the vehicle interior depending on the existing situation.

It is possible according to the invention that the incoming air is ambient air from the outside or air from the vehicle interior or a mixture of the two.

The above-described object is furthermore achieved by a method for spreading out incoming air in a heat exchanger or an air-conditioning unit, wherein the method comprises the following steps:

supplying incoming air into the applicative stratification, spreading out the incoming air into at least two portions by means of the stratification strands of the applicative stratification, conducting outgoing air portions out of the stratification strands, so that the outgoing air portions form an outgoing air stratification after the applicative stratification.

The method can advantageously additionally comprise the following step:

heating at least one outgoing air portion by means of the associated stratification strand after the spreading out in the respective stratification strand. This takes place in a heater.

The method can advantageously additionally comprise the following step alone or additionally in combination with the preceding step of heating:

cooling at least one outgoing air portion by means of the associated stratification strand after the spreading out in the respective stratification strand. The step of cooling takes place in a cooler.

Due to the use of a heater according to the invention having applicative stratification, a suitable temperature stratification can be set, which is suitable for the vehicle interior. According to the invention, heated air portions do not have to be mixed with non-heated air portions after the heat exchanger, since the temperature layers already have an optimum temperature. However, this can also be carried out according to the invention as described above. The stratification strands are preferably set suitably to the respective temperature, so that the exiting outgoing air portion no longer has to be cooled subsequently. This can have a positive influence, in particular in cold ambient conditions, directly in the range extension of electrically driven vehicles. Due to the saving of the electrical energy in the stratification strands, a range extension occurs. This applies accordingly to a cooler according to the invention, in which a warm air portion does not have to be admixed in the event of excessively strong cooling in the cooler.

BRIEF DESCRIPTION OF THE DRAWINGS

The invention will be explained in greater detail hereafter on the basis of an exemplary embodiment. In the FIGURE

DETAILED DESCRIPTION

FIG. 1 shows an air-conditioning unit according to the invention.

FIG. 1 shows an air-conditioning unit 1 having three outlets 2a, 2b, 2c and an inlet opening 3, which are introduced into a housing of the air-conditioning unit. A heat exchanger 4 in the form of a heater is arranged in the air-conditioning unit 1. It has three stratification strands 5a, 5b, 5c. They are arranged stacked directly on one another in the heat exchanger 4 and together form the applicative stratification. Therefore, no spacing is provided between the stratification strands 5a, 5b, 5c. The air-conditioning unit 1 is installed in a vehicle by way of example.

To generate a temperature stratification in the air-conditioning unit 1, incoming air 6, which is not allocated, is supplied to the three stratification strands 5a, 5b, 5c as part of the applicative stratification. This incoming air 6 is subsequently spread out by means of the applicative stratification in the respective stratification strand 5a, 5b, 5c into an associated outgoing air portion 7a, 7b, 7c. In this case, the respective outgoing air portion 7a, 7b, 7c is heated to a specific temperature in the associated stratification strand 5a, 5b, 5c. Thus, for example, according to FIG. 1, the outgoing air portion 7c has a higher temperature than the outgoing air portion 7a. The outgoing air portion 7b has the lowest temperature in relation to the two outgoing air portions 7a, 7c. The three outgoing air portions 7a, 7b, 7c are each supplied directly to one outlet 2a, 2b, 2c according to FIG. 1. Thus, for example, the outgoing air portion 7a coming from the stratification strand 5a is supplied directly to the outlet 2a. Accordingly, the outgoing air portion 7b is supplied to the outlet 2b and the outgoing air portion 7c is supplied to the outlet 2c. Required means for deflection or the like are not shown for this purpose in FIG. 1. According to FIG. 1, mixing of the outgoing air portions 7a, 7b, 7c does not take place between applicative stratification and the outlets 2a, 2b, 2c. However, the separate outgoing air portions 7a, 7b, 7c are embodied as a temperature stratification according to FIG. 1.

This is also possible in that an outgoing air stratification separate from one another results due to the applicative stratification, wherein each layer has a specific property. According to FIG. 1, the outgoing air portions 7a, 7b, 7c have different temperatures.

The respective stratification strand a, b, c is set by means of the control unit (not shown in FIG. 1).

The heat exchanger 4 according to FIG. 1 can be replaced by a cooler, so that the respective stratification strand would cool the outgoing air portions similarly to FIG. 1, however.

The invention claimed is:

1. A heat exchanger, comprising:
an applicative stratification, wherein the applicative stratification comprises at least two stratification strands, wherein the applicative stratification is configured in such a manner that when incoming air into the heat exchanger is supplied in the direction of the applicative stratification, the incoming air is spread out by means of the applicative stratification in the respective stratification strand into an associated outgoing air portion in a plurality of outgoing air portions, and wherein the applicative stratification is further configured in such a manner that each outgoing air portion in the plurality of outgoing air portions is at least one of: provided directly next to one another in the heat exchanger, or separated from one another in the heat exchanger only by a free space.

2. The heat exchanger according to claim 1, wherein the applicative stratification has means for heating or cooling the outgoing air portion.

3. The heat exchanger according to claim 1, wherein the stratification strands are arranged stacked on one another in the heat exchanger.

4. The heat exchanger according to claim 1, wherein multiple stratification strands are arranged in series in succession and/or parallel to one another in the heat exchanger.

5. The heat exchanger according to claim 1, wherein the heat exchanger is provided in a vehicle.

6. An air-conditioning unit, comprising:
a heat exchanger according to claim 1, comprising at least one inlet opening for the supply of incoming air and at least two outlets for the discharge of the outgoing air portions, which have been conducted through the heat exchanger.

7. The air-conditioning unit according to claim 6, wherein the air-conditioning unit comprises a control unit, wherein the respective stratification strand can be set by means of the control unit.

8. The air-conditioning unit according to claim 6, wherein the air-conditioning unit is provided in a vehicle.

9. A method for spreading out incoming air in a heat exchanger, comprising the following steps:
supplying incoming air into an applicative stratification,
spreading out the incoming air into at least two portions by means of stratification strands of the applicative stratification, and
conducting outgoing air portions out of the stratification strands, so that the outgoing air portions form an outgoing air stratification after the applicative stratification, wherein the outgoing air portions are at least one of: provided directly next to one another in the heat exchanger, or separated from one another in the heat exchanger only by a free space.

10. The method according to claim 9, wherein the method comprises the further following step:
heating at least one outgoing air portion by means of the associated stratification strand after the spreading out in the respective stratification strand.

11. The method according to claim 9, wherein the method comprises the further following step:
cooling at least one outgoing air portion by means of the associated stratification strand after the spreading out in the respective stratification strand.

12. The method according to claim 10, wherein the method comprises the further following step:
cooling at least one outgoing air portion by means of the associated stratification strand after the spreading out in the respective stratification strand.

* * * * *